United States Patent Office 3,071,481
Patented Jan. 1, 1963

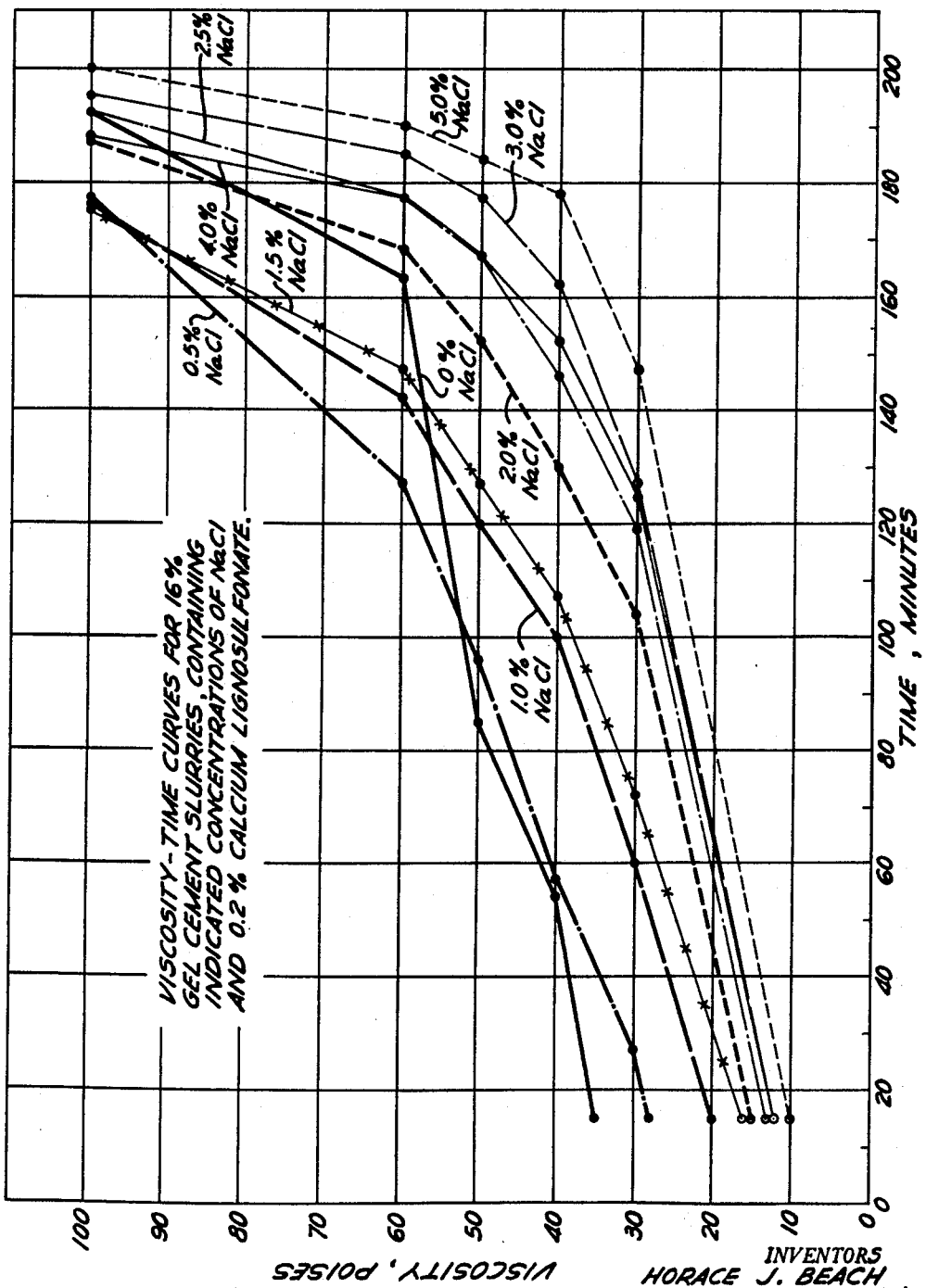

3,071,481
CEMENT COMPOSITION
Horace J. Beach, Houston, Tex., and Homer C. Morgan, Lafayette, La., assignors to Gulf Oil Corporation, Pittsburgh, Pa., a corporation of Pennsylvania
Filed Nov. 27, 1959, Ser. No. 855,567
12 Claims. (Cl. 106—90)

This invention relates to cement compositions and more particularly to improved gel cement compositions suitable for use in cementing wells.

It is common practice in compounding cement compositions for cementing casing in oil and gas wells to incorporate hydratable colloidal clays, particularly bentonite, in the cement composition to increase the volume of cement slurry obtained from a given amount of cement and thereby reduce the cost of the cement. For example, the incorporation in a cement slurry of bentonite in an amount equal to 10 percent of the weight of the dry cement will permit addition of extra water and will, without impairing the stability of the cement slurry, double the volume of the slurry and reduce the cost of a given volume of slurry by about 15 percent. The incorporation of hydratable clays in cement slurries also reduces the density of the slurries, improves the perforating properties of the set cement, reduces the rate of filtration of liquid from the cement slurry, and results in a smooth easily pumpable cement slurry. Cements containing hydratable clays are commonly referred to as gel cements, and the percent clay in the cement is ordinarily used to identify the cement. A gel cement containing 16 percent colloidal clay is referred to as a 16 percent gel cement.

Each percent, by weight of the dry cement, of colloidal clay in the gel cement composition requires approximately 4.5 percent of water merely to meet the water requirements of the clay in the preparation of a cement slurry. For example, a gel cement slurry containing 10 percent bentonite would require 45 percent, by weight of the dry cement, water in addition to the 46 percent water used in the preparation of standard slurries of class A common cement. In spite of the large amounts of water in the gel cement slurries the incorporation of large amounts of bentonite in cement slurries causes a marked increase in the viscosity of the slurries. If sufficient water is added to the slurry to give it a viscosity in a range that allows the slurry to be readily handled in the equipment ordinarily available, the solids settle from the liquid during setting of the cement and the hardened cement has a very low compressive strength. When a principal purpose of the cement is to support casing in the hole, the industry generally demands a cement which, upon setting for 24 hours, has a compressive strength of at least 500 p.s.i. Because of the difficulties in forming a readily pumpable high gel cement slurry which will set to a hardened cement of acceptable strength, the maximum bentonite concentration ordinarily used in the preparation of gel cements for cementing wells is about 10 percent by weight of the dry cement. Gel cement slurries heretofore available having concentrations of colloidal clay in excess of 10 percent and acceptable viscosities ordinarily did not set to hardened cements of adequate strength to permit their use in cementing wells to support casing in the hole.

The lower limit of compressive strength of 500 p.s.i. is a rule of thumb used to prevent the use of very low cost cement slurries of low strength for purposes for which they are not suitable. In many instances the principal purpose of the cement is to furnish a lightweight annular fill, in which event cements having 24 hour compressive strengths less than 500 p.s.i. may be useful.

It is also desirable to increase the early strengths of the weak cements used for purposes other than supporting casing in the hole, but early strengths above 500 p.s.i. are not then mandatory as they are when the cement is used to support casing.

The gel cements heretofore available have the further disadvantage of gradually and continuously increasing in viscosity after mixing. Ordinary pumping equipment can readily handle cements having a viscosity of 30 poises or less and that viscosity has been recommended as the maximum viscosity for cement slurries. Although once pumping has started pumping equipment ordinarily used can handle slurries having viscosities well above 30 poises, the higher initial viscosities and more rapid increase in viscosity of the gel cements immediately after mixing heretofore has precluded safe use of gel cements containing more than about 10 percent bentonite. Thus, the high gel strengths of high gel cements, together with their high viscosity, interfere with pumping of the cement and limit the maximum clay concentration that can be used.

Compounds usually referred to as dispersing or plasticizing agents have been added to the gel cements to reduce their viscosity and delay their increase in viscosity after mixing with water. The most widely used dispersing agent, calcium lignosulfonate, is also a retardant and its use in high concentrations delays the setting of the cement, thereby causing loss of time by the drilling rig while waiting on cement. Hence, the use of dispersing agents alone is not a satisfactory method of counteracting the viscosity of cement slurries.

This invention resides in novel gel cement compositions having high concentrations of a colloidal clay and capable upon admixture with water of forming slurries, particularly useful for cementing oil and gas wells, characterized by low viscosities and good pumping characteristics and the ability to set to form hardened cements of increased early strength. It has been discovered that by the incorporation of certain metallic salts, particularly sodium chloride and calcium chloride, and a dispersing agent in high gel cement slurries a high strength cement can be prepared from readily pumpable gel cement slurries containing more than 12 percent colloidal clay and sufficient water to satisfy the demands of the clay.

The single FIGURE of the drawings presents a number of curves of the viscosity, measured under conditions simulating the setting of casing in a 3,000 foot well, of 16 percent bentonite cement slurries versus the time in minutes from the mixing of the slurry for a number of slurries having sodium chloride concentrations ranging from 0 to 5 percent.

The cements from which the novel cement compositions of this invention are prepared are hydraulic cements of which Portland cement is a preferred type. Pozzolanic cements also are suitable for use in this invention. The cements that can be used in the preparation of the novel compositions of this invention are described in the publication entitled "API Specification For Oil Well Cements and Cement Additives" (API STD 10-A, sixth edition, January 1959) published by the American Petroleum Institute. The cements are there defined as "The product obtained by grinding clinker consisting essentially of hydraulic calcium silicates to which no additions, other than suitable set modifying agents, have been interground or blended during manufacture." A suitable set modifying agent is one which has no deleterious effect on the durability of the hardened cement and causes no retrogression in strength of the cement. Cements of classes A, B, C, N, D, E, and F described on page 4 of the API specification are suitable. In addition to the common cements of those classes, the retarded and non-retarded slow set cements can be used.

The clay mixed with the cement in the preparation of the novel cement compositions is a colloidal hydratable, swelling type clay. Such clays are clays of the bentonite group, particularly montmorillonite, and are widely used in the drilling of gas and oil wells to modify the characteristics of drilling muds. The clays satisfactory for use in this invention have been used commercially in the preparation of the low gel cements heretofore used in the cementing of wells. Colloidal clays suitable for use in the cement compositions of this invention are obtained principally from the states of Wyoming and South Dakota.

The colloidal clay is mixed with the dry cement in amounts ranging from 12 to about 35 percent by weight of the dry cement. The concentration of the clay in the cement composition will control the amount of water to be added to prepare the cement slurry and the total volume of cement slurry obtained from a sack of cement, and will influence the viscosity of the cement slurry and the strength of the hardened cement. The volume and water content of the cement slurries increase as the concentration of the colloidal clay in the cement composition is increased. The term "volume" is used to designate the cubic measure of slurry quantity obtained from a given amount of dry cement. Thus, the reduction in cement costs increases as the clay concentration increases, and it is desirable to use cement slurries having the highest possible clay concentration commensurate with acceptable performance properties of the cement. Because the viscosity of the cement slurry increases, and the strength of the hardened cement decreases, as the clay concentration is increased, there is a maximum clay concentration above which gel cements are not suitable for cementing oil wells. Gel cement slurries of satisfactory viscosity and capable of forming hardened cements of satisfactory strength can be prepared without incorporating calcium chloride or sodium chloride if the clay concentration is about 10 percent or less. This invention is useful in the preparation of improved gel cements containing more than 12 percent clay and is particularly valuable in the preparation of improved gel cement slurries of reduced viscosity and improved pumpability capable of forming hardened cements of increased strength containing 14 to 20 percent clay.

The preferred inorganic salts which can be added to the cement composition to produce the improved cement slurries and hardened cements of increased strength are sodium chloride and calcium chloride. Other salts that have been found to be effective in modifyiing the gel cement slurries and the hardened cement are sodium nitrate, and sodium sulfate. Other alkali metal chlorides are also effective. Sodium chloride, in particular, has advantages over the other salts mentioned in causing a much larger reduction in the viscosity of the gel cement slurry and in producing a hardened cement of increased strength. Sodium chloride has further advantages in respect to its cost and its availability. Sodium sulfate and sodium nitrate, for example, produce a hardened cement of less strength than when sodium chloride is added and are not as effective in reducing the viscosity of the gel cement slurry. For convenience, in the general description of this invention the salt is identified as sodium chloride.

The concentration of the sodium chloride in the gel cement slurries of this invention is in the range of 0.5 to 5 percent. The lower limit of the sodium chloride concentration is the concentration required to produce a slurry having a viscosity low enough to allow the slurry to be pumped without difficulty and capable of setting to a cement of adequate strength. The maximum concentration of sodium chloride is the lowest concentration of sodium chloride at which the solid ingredients of the cement slurries settle from the liquid. Both the maximum and minimum concentrations will depend upon the concentration of the colloidal clay in the cement slurry. At lower concentrations of colloidal clay, for example in a 12 percent gel cement, a slurry of satisfactory viscosity may be prepared with as low as .5 percent sodium chloride with acceptable concentrations of dispersing agent. At higher gel concentrations, for example in the range of 20 percent colloidal clay, a minimum concentration of about 2.5 percent sodium chloride may be required to produce a slurry of satisfactory viscosity. In general, slightly higher concentrations of calcium chloride than sodium chloride are required to produce a given reduction in viscosity or increase in strength.

Dispersing agents, frequently referred to as water reducers or plasticizing agents, are added to the cement composition to lower the viscosity of the slurry obtained upon mixing the cement ingredients with water. The preferred dispersing agent is calcium lignosulfonate which is widely used in the preparation of cement slurries for cementing oil and gas wells. The calcium lignosulfonate is added in concentrations ranging from 0.1 percent to 1.5 percent, and preferably in the range of 0.2 percent to 1.0 percent. Higher concentrations than 1.0 percent can be used but ordinarilly the improved results obtained do not justify the added cost of the cement compoition. Moreover, the retarding effect of calcium lignosulfonate on the setting of cement compositions ordinarily makes use of concentrations of calcium lignosulfonate in excess of 1.0 percent undesirable. Other dispersing agents known to reduce the water requirements of cement slurries can be used in place of the calcium lignosulfonate. Examples of other dispersing agents are gallic acid, sodium carboxymethylcellulose, starch, and lignins.

Although both the sodium chloride and the dispersing agents have the effect of reducing the viscosity of the gel cement slurry, the ingredients are not completely interchangeable. The addition of sodium chloride to the slurry causes a marked and important increase in the strength of the hardened cement as well as a reduction in the viscosity of the gel cement slurry. The dispersing agents have no such strength increasing property and in fact ordinarily cause some reduction in strength of the hardened cement. The strength increasing and viscosity reducing properties of sodium chloride and the viscosity reducing and retarding effects of calcium lignosulfonate do, however, allow control of the properties of the cement slurry by adjustment of the concentrations of the sodium chloride and calcium lignosulfonate within ranges giving slurries having desired properties. For example, a 16 percent gel cement suitable for cementing at depths in excess of 13,000 feet has been prepared containing 0.8 percent calcium lignosulfonate to retard the setting of the cement. The addition of 3.0 percent sodium chloride to the slurry resulted in a slurry that was too thin. Reduction of the sodium chloride concentration to 2.0 percent resulted in a retarded cement slurry having a viscosity of 15 poises. Calcium lignosulfonate alone could not be used to adjust the viscosity of the 16 percent gel cement slurry because of the low strength of the resultant hardened cement and the excessive retarding effect of the calcium lignosulfonate.

The colloidal clay and cement can be mixed together before mixing with water to form the cement slurry or simultaneously with the mixing with water, or the clay can be added to a slurry of cement and water. Because of the difficulties encountered in mixing colloidal clay into a cement-water slurry, as a practical matter the cement and clay must be mixed with the water simultaneously. Preferably, the clay and cement are blended in a dry condition for the subsequent admixture with water. The colloidal clay cannot be added to the water followed by the subsequent incorporation of the cement in the clay-water mixture to prepare the high gel cements of this invention. The sodium or calcium chloride and dispersing agent can be blended with the dry materials or added with the water used in preparing the slurry. When the cement slurry is to be used in the cementing of an offshore well, it is advantageous to use sea water in the preparation of the slurry. The sea water not only provides a low cost source of sodium chloride but produces a cement of improved strength and pumping characteristics over cements in which fresh water and a substantially pure sodium chloride is used, apparently as a result of the presence of small amounts of other salts such as magnesium sulfate in the sea water.

Conventional cement modifying ingredients, for example water loss reducing additives such as starch, used to modify specific properties of the cement can be incorporated in the novel cement compositions of this invention. Another typical additive is a mixture of formaldehyde and water soluble chromates, which are added to the mixture to produce a cement slurry with reduced sensitivity to contamination by organic constituents which may be introduced into the cement slurry as a result of mixing the slurry with drilling mud remaining in the borehole.

The reduction of the viscosity of high gel cements, the increase in their strength, and the improvement of the pumping characteristics of the cement slurries are illustrated by the following examples:

Measured amounts of an API class A common cement and bentonite were added to a measured amount of water in a one quart Waring Blendor operated at slow speed in a 15 second period. After addition of the cement and bentonite had been completed, the Waring Blendor was turned to high speed and mixing continued for 35 seconds. The procedure was repeated with measured amounts of sodium chloride added to the water to give cement slurries having sodium chloride concentrations increasing in increments of 0.5 percent to a concentration at which the slurry was not stable as shown by settling of solids from the liquid in the slurry. Test specimens were prepared from the slurry for the determination of the strength of the hardened cement after 24 hours of curing at elevated temperatures and pressures in accordance with the well simulation test schedules for a depth of 2,000 feet described in Section 5 of the bulletin entitled "API Recommended Practice for Testing Oil-Well Cements and Cement Additives" (API RP 10-B, eighth edition, January 1959). The maximum pressure and temperature reached during the curing period were 1,600 p.s.i. and 110° F., respectively. The procedure was repeated for cement slurries containing 12, 14, 16, 20, 30 and 35 percent bentonite. It has been found that the amount of water required per percent of bentonite is reduced from the 4.5 percent required for ordinary gel cements to 4.3 percent when sodium chloride is added to the cement slurry. The amount of water used in the preparation of the test specimens was based on that ratio and the recommended use of 46 percent water (5.19 gallons of water per sack of cement) in the preparation of neat cement slurry compositions. The preparation of the cement slurries followed the procedure described in Section 2 of API Bulletin RP 10-B. The effect of sodium chloride concentrations on the viscosities of high gel cement slurries containing calcium lignosulfonate and the 24 hour compressive strengths of the hardened cements prepared from the slurries is shown in Table I.

Table I

| Example No. | Percent Gel | Percent Water | Percent NaCl | Percent Calcium Lignosulfonate | Strength, p.s.i. | Remarks |
| --- | --- | --- | --- | --- | --- | --- |
| 1 | 12 | 97.6 | 0 | 0.2 | 782 | Very thick. |
| 2 | 12 | 97.6 | 0.5 | 0.2 | 975 | Do. |
| 3 | 12 | 97.6 | 1.0 | 0.2 | 995 | Do. |
| 4 | 12 | 97.6 | 1.5 | 0.2 | 1,057 | Do. |
| 5 | 12 | 97.6 | 2.0 | 0.2 | 1,141 | 5 sec. vortex. |
| 6 | 12 | 97.6 | 2.5 | 0.2 | 1,125 | Full vortex. |
| 7 | 12 | 97.6 | 3.0 | 0.2 | 1,117 | Thin. |
| 8 | 12 | 97.6 | 3.5 | 0.2 | 1,007 | Do. |
| 9 | 12 | 97.6 | 4.0 | 0.2 | 962 | Settled. |
| 10 | 12 | 97.6 | 5.0 | 0.2 | 950 | Do. |
| 11 | 12 | 97.6 | 0.5 | 0.5 | 810 | 17 poise. |
| 12 | 14 | 106.2 | 0 | 0.2 | 516 | Very thick. |
| 13 | 14 | 106.2 | 3.0 | 0.2 | 942 | 17 poise. |
| 14 | 16 | 115 | 0 | 0.2 | 352 | Very thick. |
| 15 | 16 | 115 | 0.5 | 0.2 | 707 |  |
| 16 | 16 | 115 | 1.0 | 0.2 | 712 |  |
| 17 | 16 | 115 | 1.5 | 0.2 | 733 |  |
| 18 | 16 | 115 | 2.0 | 0.2 | 732 |  |
| 19 | 16 | 115 | 2.5 | 0.2 | 710 |  |
| 20 | 16 | 115 | 3.0 | 0.2 | 700 | Vis. 16 poise. |
| 21 | 16 | 115 | 4.0 | 0.2 | 650 | Settled. |
| 22 | 16 | 115 | 5.0 | 0.2 | 625 | Do. |
| 23 | 20 | 132 | 0 | 0.2 | 325 | Very thick. |
| 24 | 20 | 132 | 0.5 | 0.2 | 465 | Do. |
| 25 | 20 | 132 | 1.0 | 0.2 | 408 | Thick. |
| 26 | 20 | 132 | 1.5 | 0.2 | 514 | Do. |
| 27 | 20 | 132 | 2.0 | 0.2 | 528 | Do. |
| 28 | 20 | 132 | 2.5 | 0.2 | 543 | Do. |
| 29 | 20 | 132 | 3.0 | 0.2 | 553 | Poured. |
| 30 | 20 | 132 | 3.5 | 0.2 | 557 | Do. |
| 31 | 20 | 132 | 4.0 | 0.2 | 587 | Vortex. |
| 32 | 20 | 132 | 4.5 | 0.2 | 595 | Do. |
| 33 | 20 | 132 | 5.0 | 0.2 | 603 | Do. |
| 34 | 20 | 132 | 6.0 | 0.2 | 578 | Vortex-settled. |
| 35 | 20 | 132 | 7.0 | 0.2 | 425 | Thin-settled. |
| 36 | 30 | 175 | 5.0 | 0.2 | 332 | Thick. |
| 37 | 35 | 196.5 | 5.0 | 0.2 | 223 | Very thick. |

In the initial tests, the viscosity of the resultant slurry was observed and described in general terms adequate to show whether or not the slurries would be suitable for use in the cementing of oil wells. The legend "Very thick" used under "Remarks" in Table I indicates that the slurry had a viscosity so high that satisfactory mixing was not obtained in the 35 second mixing period. The legend "Thick" indicates that the viscosity of the cement slurry was too high for a vortex to be formed in the Waring Blendor but that the cement slurry had a viscosity near the maximum that could be handled in equipment ordinarily available for the cementing of wells. The legends "Thin," "Vortex," and "Poured" are used to describe slurries having viscosities such that the slurry can easily be handled in conventional equipment available for the cementing of oil wells.

It will be noted from Table I that the hardened cement prepared from the slurry of Example 1, containing 12 percent bentonite and no sodium chloride, had a 24 hour strength well above the minimum adopted for cements to be used in the cementing of wells; however, that slurry had a viscosity so high that poor mixing was obtained. The addition of 2 percent sodium chloride by weight of the dry cement to the slurry reduced the viscosity to a satisfactory range and also increased the compressive strength approximately 50 percent. Further increases in the concentration of the sodium chloride in the slurry caused further reduction in the viscosity of the slurry. When the sodium chloride concentration reached the level of 4 percent the slurry became unstable, as shown by the separation of solids from the liquid in the slurry. An increase in the concentration of the dispersing agent to 0.5 percent allowed the preparation of a slurry with a viscosity of 17 poises, well below the maximum of 30 poises, with only 0.5 percent NaCl.

It will be noted from Example 13 that a 14 percent gel cement slurry containing 0.2 percent calcium lignosulfonate but no sodium chloride produced a cement having a 24 hour compressive strength slightly above the minimum of 500 p.s.i., but was "very thick." The addition of 3.0 percent NaCl increased the strength to 942 p.s.i. and reduced the viscosity to about 17 poises.

An increase in the concentration of the colloidal clay in the cement to 16 percent, and to 20 percent, causes a marked reduction in the strength of the cement, particularly when no sodium chloride is added to the cement slurry. It will be noted that the compressive strength of Examples 14 and 23 are 352 p.s.i. and 325 p.s.i., respectively. Moreover, both slurries were very thick and not suitable for use in cementing of wells. Addition of sodium chloride in amounts of 1.5 percent to the 16 percent gel cement slurry and 1.5 percent to 20 percent gel cement slurry as shown by Examples 17 and 26 produced cement slurries having acceptable viscosities and strength.

used with difficulty. In contrast, the 20 percent gel cement slurries containing 0.2 percent calcium lignosulfonate were useable when the sodium chloride concentration was between 1.5 percent and 5 percent and were readily useable for sodium chloride concentrations between 2 percent and 5 percent.

A series of tests on 16 percent gel cements using salts other than sodium chloride and dispersing agents other than calcium lignosulfonate were run using the procedure described above for the preparation and testing of the cement slurries. The effects of the salts other than sodium chloride and dispersing agents other than calcium lignosulfonate on the viscosities and 24 hour compressive strengths of 16 percent gel cements are illustrated by the results presented in Table III.

Table III

| Example No. | Percent Gel | Percent Water | Percent Metallic Salt | Percent Dispersing Agent | Strength, p.s.i. | Remarks |
|---|---|---|---|---|---|---|
| 51 | 16 | 115 | 3.0 NaNO₃ | ¹ 0.2 | 518 | Vis. 30 poise. |
| 52 | 16 | 115 | 3.0 NaCl | ² 0.2 | 705 | Vis. 28 poise. |
| 53 | 16 | 115 | 2.83 CaCl₂ | ¹ 0.2 | 638 | Vis. 23 poise. |
| 54 | 16 | 115 | 3.0 Na₂SO₄ | ¹ 0.2 | 692 | Very thick. |

¹ Calcium lignosulfonate.
² Gallic acid.

The higher sodium chloride requirements and tolerances for gel cements containing high colloidal clay concentrations is illustrated by the results presented in Table I. Settling of solids from the 16 percent gel cements occurred at sodium chloride concentrations of 4 percent. Settling of solids from the liquid did not occur in the 20 percent gel cements until the sodium chloride concentration reached 6 percent. The very high, 30 percent and 35 percent gel cements of Examples 36 and 37 could be used in instances where a low strength cement is acceptable.

To show the effect of the dispersing agent on the properties of the cement slurries a series of tests were performed on 20 percent gel cements of varying sodium chloride concentration and containing no dispersing agent. The procedures described above for preparing and testing the different cement compositions were used. The viscosities and 24 hour compressive strengths of 20 percent gel cements containing sodium chloride but no dispersing agent are set forth in Table II.

Table II

| Example No. | Percent Gel | Percent Water | Percent NaCl | Percent Calcium Ligno-Sulfonate | Strength, p.s.i. | Remarks |
|---|---|---|---|---|---|---|
| 38 | 20 | 132 | 0 | 0 | 329 | Very thick. |
| 39 | 20 | 132 | 0.5 | 0 | 500 | Do. |
| 40 | 20 | 132 | 1.0 | 0 | 554 | Do. |
| 41 | 20 | 132 | 1.5 | 0 | 560 | Do. |
| 42 | 20 | 132 | 2.0 | 0 | 603 | Do. |
| 43 | 20 | 132 | 2.5 | 0 | 568 | Do. |
| 44 | 20 | 132 | 3.0 | 0 | 660 | Do. |
| 45 | 20 | 132 | 3.5 | 0 | 623 | Do. |
| 46 | 20 | 132 | 4.0 | 0 | 639 | Do. |
| 47 | 20 | 132 | 4.5 | 0 | 662 | Thick. |
| 48 | 20 | 132 | 5.0 | 0 | 525 | Do. |
| 49 | 20 | 132 | 6.0 | 0 | 517 | Settled. |
| 50 | 20 | 132 | 7.0 | 0 | 505 | Do. |

It will be noted by a comparison of Examples 38 through 50 in Table II with Examples 23 through 35 in Table I that the addition of the calcium lignosulfonate to the cement slurry produces a slight reduction in the strength of the 24 hour cured cement. However, it also will be noticed that only the dispersing agent-free slurries containing 4.5 percent and 5 percent (Examples 47 and 48) had viscosities that would allow them to be used for well cementing, and in both instances, the viscosity was at the upper limit at which the slurries could only be The substitution of sodium nitrate for sodium chloride in a 16 percent gel cement produced a cured cement of satisfactory strength, but a lower strength than a cement containing a corresponding concentration of sodium chloride, and a viscosity substantially higher than the cement slurries prepared by the addition of sodium chloride and calcium lignosulfonate to the gel cement slurry. Similar results were obtained by the substitution of calcium chloride for the sodium chloride but neither the reduction in the strength of the cement nor the increase in the viscosity of the slurry were as great as when sodium nitrate was substituted for sodium chloride. The substitution of gallic acid for the calcium lignosulfonate caused no reduction in the strength of the cement but the gallic acid was not as effective a dispersing agent as the calcium lignosulfonate.

A series of thickening time tests on 16 percent gel cements of varying sodium chloride concentration and containing 0.2 percent calcium lignosulfonate were run with a thickening time tester unit by the standard procedure described on page 10 of the above-identified bulletin API RP 10-B for a simulated depth of 3,000 feet. The results of the test are illustrated in the drawing. It will be noted from the drawing that the 16 percent gel cement containing no sodium chloride at no time had a viscosity of 30 poises or less. The addition of 1 percent sodium chloride to the slurry resulted in a time of 60 minutes before the viscosity of the slurry reached 30 poises. Further additions of sodium chloride to the slurry caused further increases in the time at which the slurry had a viscosity less than 30 poises. A 16 percent gel cement slurry containing 3 percent sodium chloride had a viscosity of 30 poises or less for 127 minutes. It will be noted from an examination of the drawing that the 16 percent gel cement slurries containing 2 percent or more sodium chloride have thickening time curves in which there is a long period during which there is very little increase in the viscosity of the cement slurry. The total time required for thickening to a viscosity of 100 poises, however, does not vary widely with the sodium chloride concentration in the gel cement slurry. Thus, the novel cement slurries of this invention are characterized by a long period during which they have a low viscosity and may be readily handled in conventional pumping equipment, followed by a rapid increase in viscosity. A rapid increase in viscosity allows the slurries to be used without loss of time while waiting for the cements to harden.

It has been discovered that the incorporation of sodium chloride and a dispersing agent in gel cements containing 12 percent or more colloidal clay has an effect different from the incorporation of sodium chloride in low gel concentration or neat cement slurries. In neat cement slurries and in low gel concentrations small amounts of sodium chloride appear to accelerate the set of the cement. If high concentrations, for example above about 3 percent, of sodium chloride are added to neat cement slurries their set is retarded. Increases in the sodium chloride concentration to the range of saturated water solutions may completely prevent setting of the cement, depending on the response characteristics of the cement. In the high gel cements with which this invention is concerned, the incorporation of sodium chloride retards the increase in viscosity of the gel cement slurries to provide a longer pumpable time for the slurry. After the long period during which they have a viscosity suitable for pumping, high gel cement slurries containing sodium chloride increase rapidly in viscosity. The addition of sodium chloride to the gel cements also causes a marked increase in the early strength of the cement. When sea water is used as a source of the sodium chloride, further increases in the early strength of the cement are obtained. For example, a 16 percent gel cement containing 0.2 percent calcium lignosulfonate and prepared from sea water had a 24 hour compressive strength of 788 p.s.i. after curing at a pressure of 1600 p.s.i. and temperature of 110° F.

The novel cement slurries of this invention are further characterized by a low water loss. The 16 percent gel cement of Example 20 was tested for water loss by the standard procedure described on pages 6 and 7 of the API Bulletin API RP 10-B. The water loss of the slurry was 224 milliliters in 30 minutes. In comparison, neat cement slurries have a water loss approximately four times as great and 16 percent gel cement slurries containing no sodium chloride or calcium lignosulfonate have a water loss approximately twice as great.

In the following claims, the term "consisting essentially" has been used to define the novel cement compositions and gel cement slurries of this invention. The term "consisting essentially" is not meant to exclude all ingredients other than those specified but includes within its scope unspecified ingredients which may be added to the cement without materially affecting the basic and novel characteristics of the cement compositions and slurries.

We claim:

1. A cement composition consisting essentially of a hydraulic cement, 12 to 35 percent of a colloidal clay, 0.5 to 5.0 percent of an inorganic salt selected from the group consisting of sodium chloride and calcium chloride, and 0.1 to 1.5 percent of an organic dispersing agent, the percentages of colloidal clay, inorganic salt, and organic dispersing agent being expressed in percentage by weight of the hydraulic cement.

2. A cement composition as set forth in claim 1 in which the inorganic salt is sodium chloride.

3. A cement composition as set forth in claim 1 in which the inorganic salt is calcium chloride.

4. A cement composition as set forth in claim 1 in which the colloidal clay is bentonite.

5. A cement composition as set forth in claim 1 in which the dispersing agent is calcium lignosulfonate.

6. A cement composition consisting essentially of Portland cement, 14 to 20 percent bentonite, 0.5 to 5.0 percent sodium chloride, and 0.1 to 1.0 percent calcium lignosulfonate, the percentages of bentonite, sodium chloride, and calcium lignosulfonate being expressed in percentage by weight of the Portland cement.

7. A gel cement slurry consisting essentially of a hydraulic cement, 12 to 35 percent bentonite, 0.5 to 5.0 percent of an inorganic salt selected from the group consisting of sodium chloride and calcium chloride, 0.1 to 1.0 percent of an organic dispersing agent, and water in a percentage equal to approximately 4.3 times the percentage of bentonite plus 46 percent, the percentages of bentonite, inorganic salt, organic dispersing agent, and water being expressed in percent by weight of the dry Portland cement.

8. A gel cement slurry consisting essentially of Portland cement, 12 to 35 percent bentonite, 0.5 to 5.0 percent of an inorganic salt selected from the group consisting of sodium chloride and calcium chloride, 0.1 to 1.0 percent of an organic dispersing agent, and about 97 percent to 175 percent water, the percentages of the bentonite, inorganic salt, organic dispersing agent, and water being expressed in percent by weight of the Portland cement.

9. A gel cement slurry for cementing oil wells consisting essentially of a hydraulic cement, 14 to 20 percent bentonite, 0.5 to 5.0 percent sodium chloride, 0.1 to 1.0 percent of an organic dispersing agent, and water in a percentage equal to approximately 4.3 times the percentage of bentonite plus 46 percent, the percentages of bentonite, sodium chloride, organic dispersing agent, and water being expressed in percent by weight of the hydraulic cement.

10. A gel cement slurry composition as set forth in claim 9 in which the dispersing agent is calcium lignosulfonate.

11. A gel cement slurry having a viscosity below about 30 poises and capable of setting to a cement having a compressive strength in excess of about 500 p.s.i. consisting essentially of a hydraulic cement, between about 12 and 35% of a colloidal clay, 0.5 to 5% of an inorganic salt selected from the group consisting of sodium chloride and calcium chloride, 0.1 to 1.0% of an organic dispersing agent, and water, the percentages of colloidal clay, inorganic salt and organic dispersing agent being expressed in percentage by weight of the hydraulic cement and the percentage of water being sufficient to form a slurry having a viscosity less than about 30 poises and less than the amount of water which will cause weakening of the set cement below about 500 p.s.i.

12. A gel cement slurry for cementing oil wells consisting essentially of a hydraulic cement, 14 to 20 percent bentonite, 0.5 to 5.0 percent calcium chloride, 0.1 to 1.0 percent of an organic dispersing agent, and water in a percentage equal to approximately 4.3 times the percentage of bentonite plus 46 percent, the percentages of bentonite, calcium chloride, organic dispersing agent, and water being expressed in percent by weight of the hydraulic cement.

References Cited in the file of this patent

UNITED STATES PATENTS

| | | |
|---|---|---|
| 1,755,502 | Collings | Apr. 22, 1930 |
| 2,499,445 | Ammann | Mar. 7, 1950 |
| 2,582,459 | Salathiel | Jan. 15, 1952 |
| 2,646,360 | Lea | July 21, 1953 |
| 2,690,975 | Scripture | Oct. 5, 1954 |
| 2,705,050 | Davis | Mar. 29, 1955 |
| 2,806,531 | Morgan | Sept. 17, 1957 |
| 2,840,483 | Morgan | June 24, 1958 |
| 2,880,102 | Woodard et al. | Mar. 31, 1959 |
| 2,945,769 | Gama et al. | July 19, 1960 |

OTHER REFERENCES

Davis: "The Swelling of Bentonite and Its Control," Ind. and Eng. Chem., volume 19, No. 12 (pages 1350–2), December 1927.